(12) United States Patent
Holliday et al.

(10) Patent No.: US 12,702,953 B2
(45) Date of Patent: Aug. 11, 2026

(54) HOT MELT ADHESIVE FOR SPIRAL WOUND MEMBRANE BONDING

(71) Applicant: Henkel AG & Co. KGaA, Duesseldorf (DE)

(72) Inventors: Adam D. Holliday, Sycamore, IL (US); Dwight Heinrich, Aurora, IL (US); Michael M. Izzo, South Windsor, CT (US); Nicole Smith, South Windsor, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 616 days.

(21) Appl. No.: 18/069,275

(22) Filed: Dec. 21, 2022

(65) Prior Publication Data

US 2023/0120156 A1 Apr. 20, 2023

Related U.S. Application Data

(63) Continuation of application No. PCT/US2021/038348, filed on Jun. 22, 2021.

(60) Provisional application No. 63/042,603, filed on Jun. 23, 2020.

(51) Int. Cl.

| | |
|---|---|
| ***B01D 63/10*** | (2006.01) |
| ***B01D 69/10*** | (2006.01) |
| ***B01D 69/12*** | (2006.01) |
| ***C02F 1/44*** | (2023.01) |
| ***C09J 7/30*** | (2018.01) |
| ***C09J 123/20*** | (2006.01) |

(52) U.S. Cl.

CPC ....... *B01D 63/1031* (2022.08); *B01D 63/101* (2022.08); *B01D 69/10* (2013.01); *B01D 69/12* (2013.01); *C02F 1/441* (2013.01); *C09J 7/30* (2018.01); *C09J 123/20* (2013.01); *B01D 2313/042* (2022.08)

(58) Field of Classification Search

None

See application file for complete search history.

(56) References Cited

U.S. PATENT DOCUMENTS

| | | | |
|---|---|---|---|
| 10,357,407 | B2 | 7/2019 | Bunnelle |
| 12,569,812 | B2 | 3/2026 | Kishino et al. |
| 2012/0103892 | A1 | 5/2012 | Beauchamp et al. |
| 2015/0122407 | A1 | 5/2015 | Chartrel et al. |
| 2015/0298063 | A1 | 10/2015 | Peichel et al. |

(Continued)

FOREIGN PATENT DOCUMENTS

| | | | |
|---|---|---|---|
| CN | 105829469 | A | 8/2016 |
| JP | H07204471 | A | 8/1995 |

(Continued)

OTHER PUBLICATIONS

C.W. Paul, "Hot Melt Adhesives," in Adhesion Science and Engineering-2, Surfaces, Chemistry and Applications, M. Chaudhury and A. V. Pocius eds., Elsevier, New York, 2002, p. 718.

(Continued)

*Primary Examiner* — Laura C Powers

(74) *Attorney, Agent, or Firm* — Steven C. Bauman

(57) ABSTRACT

Disclosed is a high-penetration hot melt adhesive for separation apparatus, such as thin film composite reverse osmosis filtration membranes. Also disclosed is a method of using these hot melt adhesives to bond these membranes to one or more other components of a separation apparatus.

15 Claims, 8 Drawing Sheets

(56) References Cited

U.S. PATENT DOCUMENTS

| | | | |
|---|---|---|---|
| 2017/0056833 | A1 | 3/2017 | Nguyen et al. |
| 2020/0017731 | A1 | 1/2020 | Takahashi |

FOREIGN PATENT DOCUMENTS

| | | | |
|---|---|---|---|
| JP | 2007283287 | A | 11/2007 |
| JP | 2013544642 | A | 12/2013 |
| JP | 2017080709 | A | 5/2017 |
| JP | 2018008272 | A | 1/2018 |
| KR | 20190122640 | A | 10/2019 |
| WO | 9849249 | A1 | 11/1998 |
| WO | 2017179672 | A1 | 10/2017 |
| WO | 2020069475 | A1 | 4/2020 |

OTHER PUBLICATIONS

International Search Report for International PCT Patent Application No. PCT/US2021/038348 dated Oct. 13, 2021.

(PASS)

(FAIL)

HOT MELT ADHESIVE FOR SPIRAL WOUND MEMBRANE BONDING

FIELD OF THE INVENTION

This invention relates to thermoplastic hot melt adhesives that are used to bond together certain components of a separation apparatus such as a membrane filter used for reverse osmosis. The inventive thermoplastic hot melt adhesives can effectively bond the membrane components. In one embodiment the invention is also directed to the membrane leaf that is bonded using this thermoplastic hot melt adhesive.

BACKGROUND OF THE INVENTION

In the construction of a spiral wound element an adhesive is used to seal each leaf of membrane (which is the active membrane for fluid separation) so that the filtered product (for example, clean water) is separated from the feed (for example, dirty water). The adhesive prevents contamination of the filtered product by the dirty feed stream. Two component curable polyurethane (PU) adhesives have dominated this application for 30 years. However, while curable PU's work very well for this application, they have some inherent limitations that are inherent to this polyurethane technology. Curable polyurethane adhesives take hours to cure, requiring a manufacturer to stockpile freshly bonded parts while the adhesive cures. Two component adhesives require storing each component separately and mixing the parts at a specific ratio just before they are used. Once mixed, the adhesive has a limited working time as the mixed components begins crosslinking and curing. Curable polyurethane adhesives are sensitive to humidity in the air and must be stored in a moisture free atmosphere. Some polyurethane adhesives exhibit sensitivity to temperature during shipping and storage.

Beyond the limitations inherent to polyurethane adhesives, all adhesives used in this application have some further performance requirements. The adhesive must strongly bond the polymer components. The bonding process must not damage the thin polymer films being bonded. The adhesive bond must resist penetration by the fluid being filtered at high pressure. The adhesive bond must maintain these properties during cleaning with high pH chemicals under high pressure.

Further, the adhesive is applied in a narrow band or bead on or near the edge of the membrane during construction of the filtration element. Viscosity is therefore an important adhesive characteristic. The adhesive needs to have a high enough viscosity range to prevent sagging or excessive spreading of the bead of adhesive. Below this range the applied adhesive will unacceptably spread and run and above this range the adhesive may not apply evenly or at all. Control of application viscosity is therefore an important parameter for acceptable bonding of reverse-osmosis membranes. A skilled worker can appreciate that there is also a delicate balance between high enough viscosity so that the bead of adhesive applied to the membrane during construction of a reverse-osmosis filtration element does not sag or spread and low enough viscosity for the adhesive to apply repeatably and evenly.

In membrane filtration, there is a growing need for adhesives that can bond materials of the filter and also help solve problems such as blistering. "Blistering" is generally understood to mean a failure of the membrane at the bonded portion of the membrane, usually due to the incursion of water between the layers of a thin-film composite membrane and the adhesive. Less blistering means fewer failures of the membrane, which gives them greater reliability and value.

There is a need for adhesives that can be used for membrane bonding which improve on the limitations of previously used adhesives in this application.

SUMMARY OF THE INVENTION

In one embodiment the disclosure is directed to a thermoplastic hot melt adhesive.

In one embodiment the disclosure is directed to the use of the disclosed thermoplastic hot melt adhesive for bonding components of a membrane filter together, such as membrane sheets of spiral-wound membrane filters used for reverse osmosis or nano filtration applications.

In one embodiment the invention is directed to a method of assembling a spiral wound filtration module. In this embodiment one or more filter packs, each of which contains a feed carrier, are wrapped about a central permeate collection tube. Each filter pack includes two generally rectangular membrane sheets with a feed carrier sheet disposed between. The filter pack is held together by the disclosed thermoplastic hot melt adhesive along edges of each membrane sheet and respective edges of the feed carrier. The solidified hot melt adhesive makes the bonded edges of the filter pack impermeable to ingress of the feed material into the interior of the membrane leaf and escape of the filtered permeate out of the interior of the membrane leaf. In this way the permeate carrier within the sealed membrane leaf provides a fluid conduit to direct the filtered permeate to the permeate collection tube. In some embodiments adhesive at the two side edges additionally affix and seal filter packs to the permeate collection tube.

Hot melt adhesives are solid at room temperature but, upon application of heat, they melt to a liquid or fluid state in which form they are applied to a substrate. On cooling, the adhesive regains its solid form. There are two types of hot melt adhesives, thermoplastic and reactive.

Thermoplastic hot melt adhesives are thermoplastic and can be repeatedly heated to the fluid state and cooled to the solid state. The hard phase(s) formed upon cooling of the adhesive imparts all of the cohesion strength, toughness, creep and heat resistance to the adhesive. Thermoplastic hot melt adhesives have no cure mechanism, cannot crosslink and will remain thermoplastic in nature. Thermoplastic hot melt adhesives are chemically different from both uncured and cured reactive hot melt adhesives. Naturally, the thermoplastic nature limits the upper temperature at which thermoplastic hot melt adhesives can be used.

Reactive hot melt adhesives are also solid at room temperature and upon application of heat, they melt to a liquid or fluid state in which form they are applied to a substrate. Reactive hot melt adhesives start out as thermoplastic materials that can be repeatedly heated to a molten state and cooled to a solid state. However, when exposed to appropriate conditions the reactive hot melt adhesive crosslinks and cures to an irreversible solid form. The final adhesive product is a crosslinked polymer material. Once the adhesive has crosslinked it is no longer thermoplastic and cannot be heated to a fluid state without destruction of the adhesive. The crosslinking provides the cured hot melt adhesive with a higher tensile strength and temperature resistance than thermoplastic hot melt adhesives. One class of reactive hot melt adhesives are polyurethane hot melt adhesives.

Open time refers to the length of time after application of the molten hot melt adhesive during which a part can be bonded to the adhesive. Open time should be sufficiently long to allow the bonding substrates to be assembled together, and repositioned, if needed. Green strength refers to initial adhesive strength of the reactive hot melt adhesive after application to a substrate and before final full curing. High green strength is desirable as it allows bonded parts to be held together by the adhesive without further clamps or fasteners. In some applications the additional strength provided when the applied reactive hot melt adhesive crosslinks and cures is advantageous.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

DETAILED DESCRIPTION OF THE INVENTION

Figure 1:
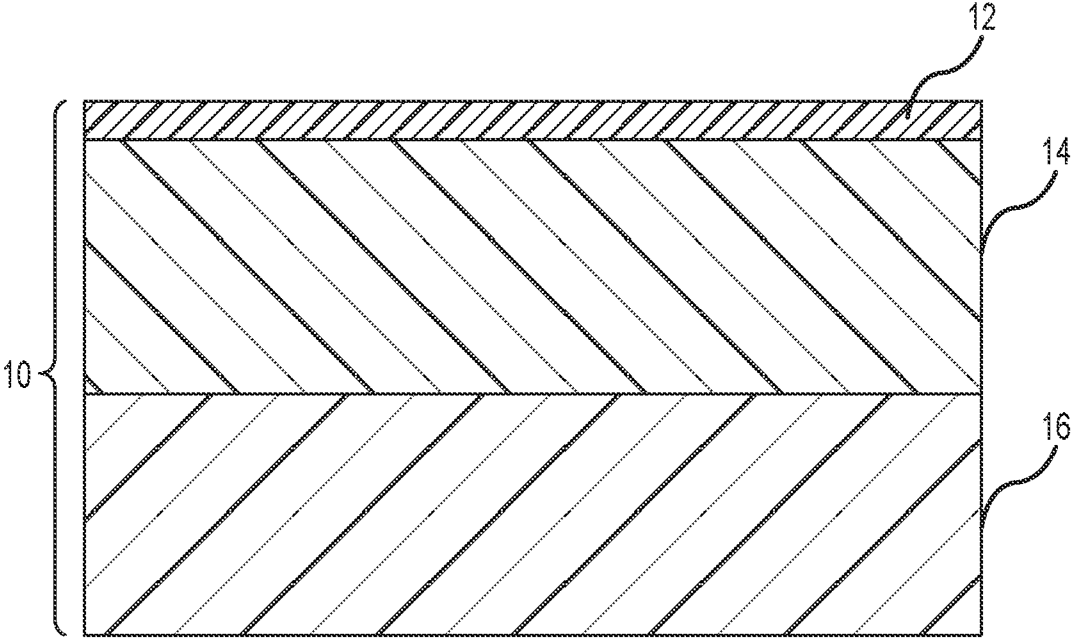
FIG. 1 shows a schematic cross section of one embodiment of a filter membrane.

Unless defined otherwise, all technical and scientific terms used herein have the same meaning as is commonly understood by one of ordinary skill in the art. As used herein for each of the various embodiments, the following definitions apply.

"Alkyl" or "alkane" refers to a hydrocarbon chain or group containing only single bonds between the chain carbon atoms. The alkane can be a straight hydrocarbon chain or a branched hydrocarbon group. The alkane can be cyclic. The alkane can contain 1 to 20 carbon atoms, advantageously 1 to 10 carbon atoms and more advantageously 1 to 6 carbon atoms. In some embodiments the alkane can be substituted. Exemplary alkanes include methyl, ethyl, n-propyl, isopropyl, isobutyl, n-butyl, sec-butyl, tert-butyl, isopentyl, neopentyl, tert-pentyl, isohexyl and decyl.

"Alkenyl" or "alkene" refers to a hydrocarbon chain or group containing one or more double bonds between the chain carbon atoms. The alkenyl can be a straight hydrocarbon chain or a branched hydrocarbon group. The alkene can be cyclic. The alkene can contain 1 to 20 carbon atoms, advantageously 1 to 10 carbon atoms and more advantageously 1 to 6 carbon atoms. The alkene can be an allyl group. The alkene can contain one or more double bonds that are conjugated. In some embodiments the alkene can be substituted.

"Amine" refers to a molecule comprising at least one —NHR group wherein R can be a covalent bond, H, hydrocarbyl or polyether. In some embodiments an amine can comprise a plurality of —NHR groups (which may be referred to as a polyamine).

"Ester" refers to the structure R—C(O)—O—R' where R and R' are independently selected hydrocarbyl groups with or without heteroatoms. The hydrocarbyl groups can be substituted or unsubstituted.

"Halogen" or "halide" refers to an atom selected from fluorine, chlorine, bromine and iodine.

"Hetero" refers to one or more heteroatoms in a structure. Exemplary heteroatoms are independently selected from N, O and S.

"Hydrocarbyl" refers to a group containing carbon and hydrogen atoms. The hydrocarbyl can be linear, branched, or cyclic group. The hydrocarbyl can be alkyl, alkenyl, alkynyl or aryl. In some embodiments, the hydrocarbyl is substituted.

"Molecular weight" refers to weight average molecular weight unless otherwise specified. The number average molecular weight $M_n$, as well as the weight average molecular weight $M_w$, is determined according to the present invention by gel permeation chromatography (GPC, also known as SEC) at 23° C. using a styrene standard. This method is known to one skilled in the art. The polydispersity is derived from the average molecular weights $M_w$ and $M_n$. It is calculated as $PD=M_w/M_n$. Polydispersity indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution.

"Oligomer" refers to a defined, small number of repeating monomer units such as 2-5,000 units, and advantageously 10-1,000 units which have been polymerized to form a molecule. Oligomers are a subset of the term polymer.

"Polyether" refers to polymers which contain multiple ether groups (each ether group comprising an oxygen atom connected top two hydrocarbyl groups) in the main polymer chain. The repeating unit in the polyether chain can be the same or different. Exemplary polyethers include homopolymers such as polyoxymethylene, polyethylene oxide, polypropylene oxide, polybutylene oxide, polytetrahydrofuran, and copolymers such as poly(ethylene oxide co propylene oxide), and EO tipped polypropylene oxide.

"Polyester" refers to polymers which contain multiple ester linkages. A polyester can be either linear or branched.

"Polymer" refers to any polymerized product greater in chain length and molecular weight than the oligomer. Polymers can have a degree of polymerization of about 20 to about 25000. As used herein polymer includes oligomers and polymers.

"Substituted" refers to the presence of one or more substituents on a molecule in any possible position. Useful substituents are those groups that do not significantly diminish the disclosed reaction schemes. Exemplary substituents include, for example, H, halogen, (meth)acrylate, epoxy, oxetane, urea, urethane, $N_3$, NCS, CN, NCO, $NO_2$, $NX^1X^2$, $OX^1$, $C(X^1)_3$, $C(halogen)_3$, $COOX^1$, $SX^1$, $Si(OX^1)iX^2_{3-i}$, alkyl, alcohol, alkoxy; wherein $X^1$ and $X^2$ each independently comprise H, alkyl, alkenyl, alkynyl or aryl and i is an integer from 0 to 3.

The disclosed adhesive is a thermoplastic hot melt adhesive. The adhesive is not reactive and does not cure or cross link. The disclosed adhesive is free of isocyanate monomers and functionality. The disclosed thermoplastic hot melt adhesive comprises a thermoplastic polymer component, a tackifier, an optional wax component, an optional antioxidant component and optional additives.

Thermoplastic Butene Component

The thermoplastic butene component will be a butene homopolymer or a copolymer comprising a butene block. A combination of butene homopolymers and/or butene copolymers can be used. Polybutene homopolymers in a number of molecular weights are commercially available, for example from INEOS; Soltex; Braskem; LyondellBasell and Cameo Chemicals. Some illustrative butene copolymers include, for example, ENGAGE polymers from Dow Chemical; TAFMER™ DF & A from Mitsui Chemicals Group; amorphous propylene/butene copolymer from Parchem; REXTAC amorphous polyalphaolefin copolymers available from REXtac LLC; KOATTRO PB M 1200M ethene butene copolymer available from Equistar Chemicals, LP and RELENE propylene/butene copolymer available from Reliance Polymers.

Thermoplastic Polymer Component

The thermoplastic hot melt adhesive composition can optionally contain one or more thermoplastic polymers or copolymers that do not contain butene. The thermoplastic polymer is a non-functional thermoplastic, e.g. a thermoplastic polymer that does not have curable or crosslinkable moieties. Non-limiting examples of suitable thermoplastic polymers include non-functional acrylic polymer, acrylic block copolymer, polyamide, polysiloxane polymer, polystyrene copolymer, divinylbenzene copolymer, polyetheramide, polyvinyl acetal, polyvinyl butyral, polyvinyl chloride, methylene polyvinyl ether, cellulose acetate, styrene acrylonitrile, amorphous polyalphaolefin (APAO), olefin block copolymer [OBC], polyolefin homopolymers and polyolefin co-polymers, thermoplastic urethane, polyacrylonitrile, ethylene acrylate copolymer, ethylene acrylate terpolymer, ethylene butadiene copolymer and/or block copolymer, styrene butadiene block copolymer, and mixtures of any of the above. Preferred thermoplastic polymers include homopolymers of polypropylene and polyethylene and their APAO variants and co-polymers comprising 2 or more of propylene, ethylene and butene, preferably butene-1 and their APAO variants. The amount of thermoplastic polymer is not critical as long is the amount does not deleteriously affect the desired adhesive properties.

Tackifier:

The hot melt adhesive composition can comprise a tackifier. The tackifier choices include natural and petroleum-derived materials and combinations thereof as described in C. W. Paul, "Hot Melt Adhesives," in Adhesion Science and Engineering-2, Surfaces, Chemistry and Applications, M. Chaudhury and A. V. Pocius eds., Elsevier, New York, 2002, p. 718, incorporated by reference herein.

Useful tackifiers for the hot melt adhesive composition of the present disclosure include hydrogenated and non-hydrogenated aliphatic tackifiers; natural and modified rosin tackifiers; aromatic tackifiers or mixtures thereof. Useful natural and modified rosins include gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin. Useful aliphatic tackifiers include C5 tackifiers available from Exxon Mobil. Useful rosin and rosin derivatives include Sylvalite RE 110L, Sylvares RE 115, and Sylvares RE 104 available from Arizona Chemical; Dertocal 140 from DRT; Limed Rosin No. 1, GB-120, Pencel C from Arakawa Chemical, KE-100 rosin ester tackifier available from Arakawa Chemical Co and Komotac 2110 rosin ester tackifier available from Komo Resins. Useful aromatic tackifiers include styrenic monomers, styrene, alpha-methyl styrene, vinyl toluene, methoxy styrene, tertiary butyl styrene, chlorostyrene, coumarone, indene monomers including indene, and methyl indene. Aromatic hydrocarbon resin tackifiers include phenolic-modified aromatic resins, C9 hydrocarbon resins, aliphatic-modified aromatic C9 hydrocarbon resins, C9 aromatic/aliphatic olefin-derived and are available from Sartomer and Cray Valley under the trade name Norsolene and from Rutgers series of TK aromatic hydrocarbon resins. Other aromatic tackifiers are alpha-methyl styrene types such as Kristalex 3100, Kristalex 5140 or Hercolite 240, all available from Eastman Chemical Co.

Wax:

The hot melt adhesive composition can optionally comprise a controlled amount of wax. Ullmann's Encyclopedia of Industrial Chemistry, the contents of which are incorporated by reference herein, describes waxes. Examples of types of waxes that may be used include natural waxes, partially synthetic waxes and fully synthetic waxes. Natural waxes are formed through biochemical processes and are products of animal or plant metabolism. Partially synthetic waxes are formed by chemically reacting natural waxes. Fully synthetic waxes are prepared by polymerizing low molar mass starting materials such as carbon, methane, ethane or propane. The two main groups of fully synthetic waxes are the Fischer-Tropsch waxes and polyolefin waxes such as polyethylene wax, polypropylene wax and copolymers thereof.

The hot melt adhesive composition can optionally comprise an acidic functional wax. Acidic functional groups are added to the wax molecule by, for example, grafting synthetic waxes with an acidic moiety such as carboxylic acid or maleic anhydride or by cleavage of the esters and/or oxidation of the alcohols in partially synthetic waxes. Acidic functional waxes can have a saponification number (mg KOH/gm wax) of less than about 90 and more advantageously from about 5 to about 30. Some useful acid functional maleated waxes can have about 50% to about 95% of maleic anhydride moieties bound to the wax backbone with the remaining maleic anhydride content not bound to the wax backbone.

Acidic functional waxes are available commercially, for example from Clariant International Ltd, Switzerland; EPChem International Pte Ltd, Singapore; Honeywell International Inc., U.S. and Westlake Chemical Corp, U.S. Advantageous acid functional waxes are the maleated polypropylene waxes. One useful maleated polypropylene wax is A-C 1325P available from Honeywell International Inc.

The hot melt adhesive composition can optionally comprise a basic functional wax. Basic functional wax is a wax includes at least one functional moiety that is basic, for example amide moieties or amine moieties. The basic functional wax can have terminal, within the backbone, or pendant basic functional moieties. Basic functional groups are added to the wax molecule by, for example, grafting synthetic waxes with a basic moiety such as amine or amide. Basic functional groups can also be introduced by reacting molecules with basic functionality into the wax molecule.

Basic functional waxes are available commercially, for example from Honeywell International Inc., U.S. and Vertellus Inc., Greensboro, N.C. and TOTAL Cray Valley Inc. Advantageous basic functional waxes are the amine and amide functional waxes. Useful basic functional waxes include ACumist from Honeywell International Inc. and Paricin 220 from Vertellus Performance Materials Inc, etc.

Additives:

The thermoplastic hot melt adhesive can optionally include, or exclude, one or more additives. Some exemplary additives include filler, thixotrope, rheology modifier, antioxidant, adhesion promoter, coloring agent, plasticizer, flame retardant, diluent, reactive diluent, moisture scavenger, and combinations of any of the above.

The thermoplastic hot melt adhesive composition can optionally include filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, nanosilica, fumed silicas, silicas that have been surface treated with a silane or silazane such as the AEROSIL® products available from Evonik Industries, silicas that have been surface treated with an acrylate or methacrylate such as AEROSIL® R7200 or R711 available from Evonik Industries, precipitated silicas, untreated silicas, graphite, synthetic fibers and mixtures thereof. When used, filler can be employed in concentrations effective to provide desired properties in the uncured composition and cured reaction products. Typically filler can be used at concentrations of about 0% to about 70% by weight of the composition and advantageously at concentrations of about 0% to about 60% by weight of the composition.

The thermoplastic hot melt adhesive composition can optionally include a thixotrope or rheology modifier. The thixotropic agent can modify rheological properties of the uncured composition. Some useful thixotropic agents include, for example, silicas, such as fused or fumed silicas, that may be untreated or treated so as to alter the chemical nature of their surface. Virtually any reinforcing fused, precipitated silica, fumed silica or surface treated silica may be used. Examples of treated fumed silicas include polydimethylsiloxane-treated silicas, hexamethyldisilazane-treated silicas and other silazane or silane treated silicas. Such treated silicas are commercially available, such as from Cabot Corporation under the tradename CAB-O-SIL® ND-TS and Evonik Industries under the tradename AEROSIL®, such as AEROSIL® R805. Also useful are the silicas that have been surface treated with an acrylate or methacrylate such as AEROSIL® R7200 or R711 available from Evonik Industries. Examples of untreated silicas include commercially available amorphous silicas such as AEROSIL® 300, AEROSIL® 200 and AEROSIL® 130. Commercially available hydrous silicas include NIPSIL® E150 and NIPSIL® E200A manufactured by Japan Silica Kogya Inc.

The rheology modifier can be employed in concentrations effective to provide desired physical properties in the uncured composition and cured reaction products. Typically rheology modifier can be used at concentrations of about 0% to about 10% by weight of the composition and advantageously at concentrations of about 0% to about 5% by weight of the composition. In certain embodiments the filler and the rheology modifier can be the same.

The thermoplastic hot melt adhesive composition can optionally include an antioxidant. Some useful antioxidants include those available commercially from BASF under the tradename IRGANOX®. Typically antioxidant can be used at concentrations of about 0% to about 5% by weight of the composition and advantageously at concentrations of about 0% to about 2% by weight of the composition.

The thermoplastic hot melt adhesive composition can optionally include one or more adhesion promoters that are compatible and known in the art. Examples of useful commercially available adhesion promoters include amino silane, glycidyl silane, mercapto silane, isocyanato silane, vinyl silane, (meth)acrylate silane, and alkyl silane. Common adhesion promoters are available from Momentive under the trade name Silquest or from Wacker Chemie under the trade name Geniosil. Silane terminated oligomers and polymers can also be used. Typically, adhesion promoter can be used at concentrations of about 0% to about 20% by weight of the composition and advantageously at concentrations of about 0% to about 15% by weight of the composition.

The thermoplastic hot melt adhesive composition can optionally include one or more coloring agents. For some applications a colored composition can be beneficial to allow for inspection of the applied composition. A coloring agent, for example a pigment or dye, can be used to provide a desired color beneficial to the intended application. Exemplary coloring agents include titanium dioxide, C.I. Pigment Blue 28, C.I. Pigment Yellow 53 and phthalocyanine blue BN. In some applications a fluorescent material can be added to brighten the appearance of the applied hot melt composition and/or allow inspection of the applied composition under UV radiation. An example is UVITEX OB available from BASF. The coloring agent will be present in amounts sufficient to allow observation or detection, for example about 0.002% or more by weight of total composition. The maximum amount is governed by considerations of cost, absorption of radiation and interference with cure of the composition. Typically coloring agent can be used at concentrations of about 0% to about 5% by weight of the composition and advantageously at concentrations of about 0% to about 2% by weight of the composition.

In some embodiments the thermoplastic hot melt adhesive can have the following compositions.

| | range | narrower range |
|---|---|---|
| thermoplastic butene component | 10-80 | 20-70 |
| thermoplastic polymer component | 0-70 | 0-50 |
| tackifier | 20-40 | 30-40 |
| wax | 0-10 | 0-10 |
| additive | 0-10 | 0-2 |

In some embodiments the thermoplastic hot melt adhesive can have some or all of the following properties.

| property | range | narrower range |
|---|---|---|
| Viscosity at 180° C. (mPa · s) | 500-8,000 | 800-7,500 |
| Softening Point (° C.) | 55-150 | 80-105 |
| hardness (Shore A) | >50 | 50-95 |
| Open Time (sec) | >30 | 80-210 |

A filtration membrane comprises one or more layers that provide a filtering effect and optionally one or more layers that support the filter layer(s). One typical membrane 10 intended for filtration use is a composite thin film sheet having a generally rectangular shape and comprised of overlying layers having the general structure shown as a schematic cross-section in FIG. 1. The membrane 10 comprises generally three layers: a thin, dense semi-permeable barrier layer 12 having, in one embodiment, a typical thickness of about 0.02-0.20 micrometer. The semi-permeable barrier layer 12 is commonly, but not necessarily a polyamide film. The barrier layer 12 overlies a microporous substrate 14 having, in one embodiment, a typical thickness of about 40-50 micrometers. The microporous substrate 14 is usually but not always comprised of a polysulfone film. The microporous substrate 14 overlies a porous support layer 16 having, in one embodiment, a typical thickness of about 100-200 micrometers. The support layer 16 is generally constructed and arranged to allow filtered fluid to pass through it easily, while also providing physical support for the other layers of the composite membrane 10. One example of a porous support layer is a polyester non-woven material. The materials of construction and their thickness, etc. may be varied depending on the exact separation application for which the membrane 10 is intended to be used.

The semi-permeable layer 12 is the active surface of the membrane 10 and is usually considered to effect the separation, either on its own or in combination with the intermediate microporous substrate 14, depending on the exact nature of the compounds being separated. For instance, if the membrane 10 is intended to be used to purify water, the membrane 10 will allow water to pass through, but not contaminants such as salt.

Figure 2:
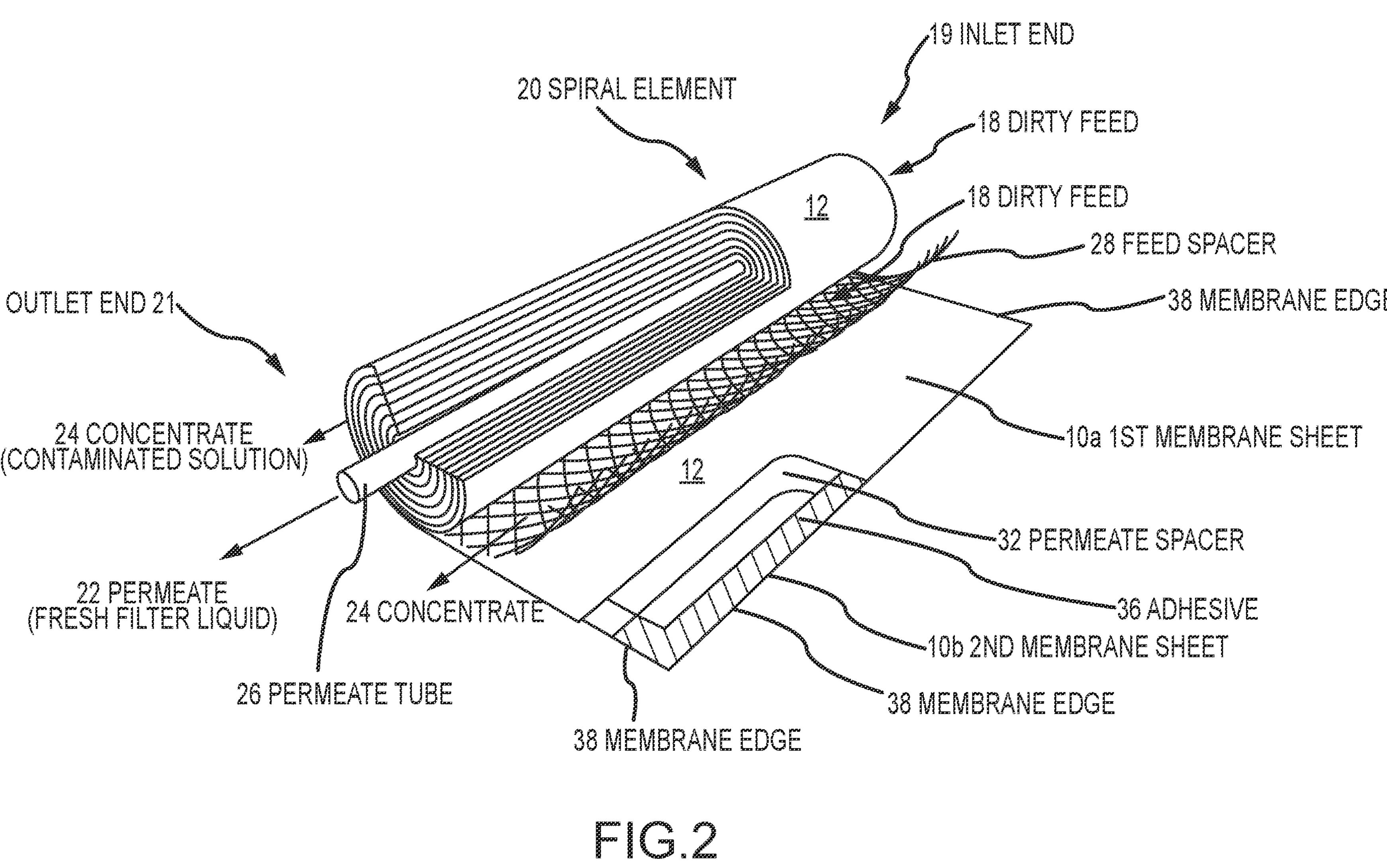
FIG. 2 shows a partially cut away and partially unrolled schematic representation of one embodiment of a spiral-wound membrane element.
Figure 3:
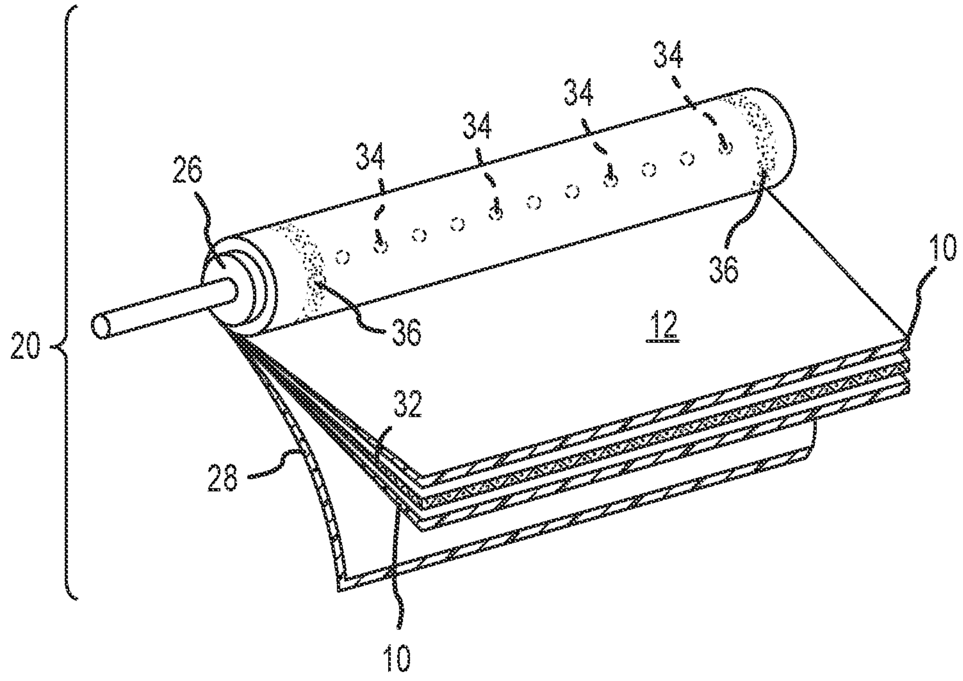
FIG. 3 shows another embodiment of a spiral-wound membrane element in a partially unrolled state with the adhesive shown in phantom.
Figure 4:
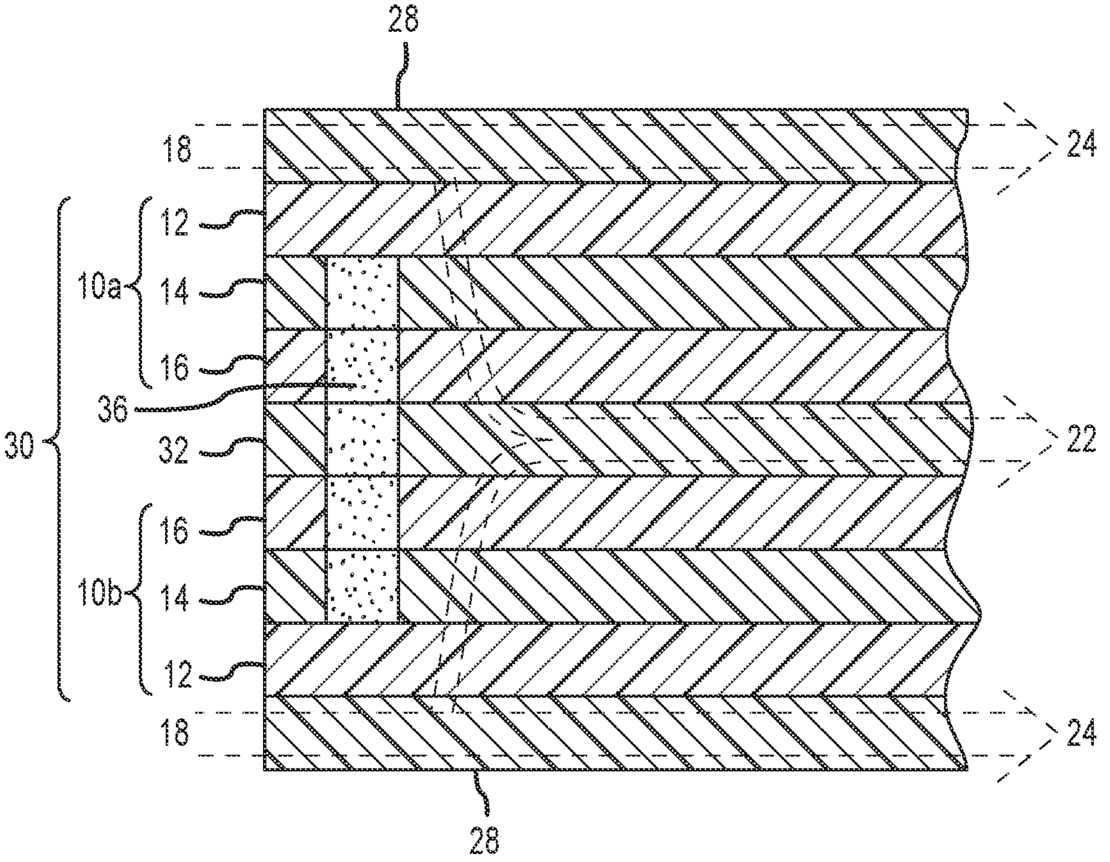
FIG. 4 is a schematic cross sectional representation of a portion of a spiral wound membrane.

With reference to FIGS. 2, 3 and 4 the membranes can be assembled into filter packs 30 comprised of two membrane portions, 10*a* and 10*b* in FIG. 4, separated by a porous permeate carrier layer 32. The membrane portions can be two separate membrane pieces or one folded membrane sheet. The membranes 10 are arranged so that each barrier layer 12 faces outwardly and each support layer 16 is adjacent to the carrier layer 32. The disclosed hot melt adhesive 36 described herein is applied to a portion of the porous permeate carrier layer 32 and/or one or both of the adjacent porous support layers 16. Adhesive 36 is applied only adjacent one or more edges 38 of the membrane material and is not applied over the entire surface.

The method of applying the adhesive 36 is not particularly limited and suitable methods are known to the skilled person. For instance, the adhesive 36 can be heated to molten form and applied in molten form as a continuous bead along most of the peripheral edges of the membrane 10 as seen in FIGS. 2 and 3. The bead size is not particularly limited but it should bond only the surface of the membrane 10 along the peripheral edges 38 to the surface of a second membrane 10 along the peripheral edges 38, leaving the interior portion of each unbonded. Suitable bead widths when applied to the membrane for some applications can be, for example, about 3 mm to about 3 cm or about 0.3 cm to about 0.6 cm. The layers 10, 32, 10 are superimposed. It is desirable for the adhesive 36 to penetrate through the permeate carrier layer 32 and into each of the membranes 10. The adhesive seals the membrane peripheral edges 38. The unbonded edge provides a permeate exit fluidly connectable to the permeate tube 26 and the carrier layer 32 between the unbonded interior portions of the membranes forms a permeate flow channel fluidly connectable to the permeate tube 26. The adhesive bond prevents the highly pressurized feed stream from flowing between the membranes and entering the permeate flow channel and also prevents permeate 22 from exiting the permeate flow channel except through the permeate exit which is fluidly connected to the permeate tube 26 in the spiral wound element. Importantly, the adhesive 36 must bond the membranes 10 and permeate carrier 32 securely enough to prevent penetration of the feed stream through the adhesive bond at any point to be acceptable. Feed stream penetration of no more than 0.25 inches from the adhesive bond edge, using the below described veining test, is considered desirable and less penetration is preferred.

This bonding process, i.e. bonding the filter pack 30 to the central permeate tube 26, and/or bonding the membrane sheet 10 along most of the peripheral sides to form a filter pack 30 is repeated as many times as necessary until the desired number of filter packs 30 are formed and attached to the permeate tube 26. The filter packs 30 are then wound tightly around the permeate tube 26 to form the spiral-wound element 20.

In one variation the filter pack 30 layers are separated by a layer of feed spacer or feed carrier 28. The feed spacer or feed carrier layer 28 provides a fluid channel so that the feed 18 can flow freely inside the spiral wound element 20. The particular details of the materials and thickness of the feed carrier 28 depend on the intended application of the spiral-wound membrane element 20, but usually it is a non-woven material that allows free flow of the feed stream 18 between the adjacent folded portions of membrane sheet 10.

Figure 6:
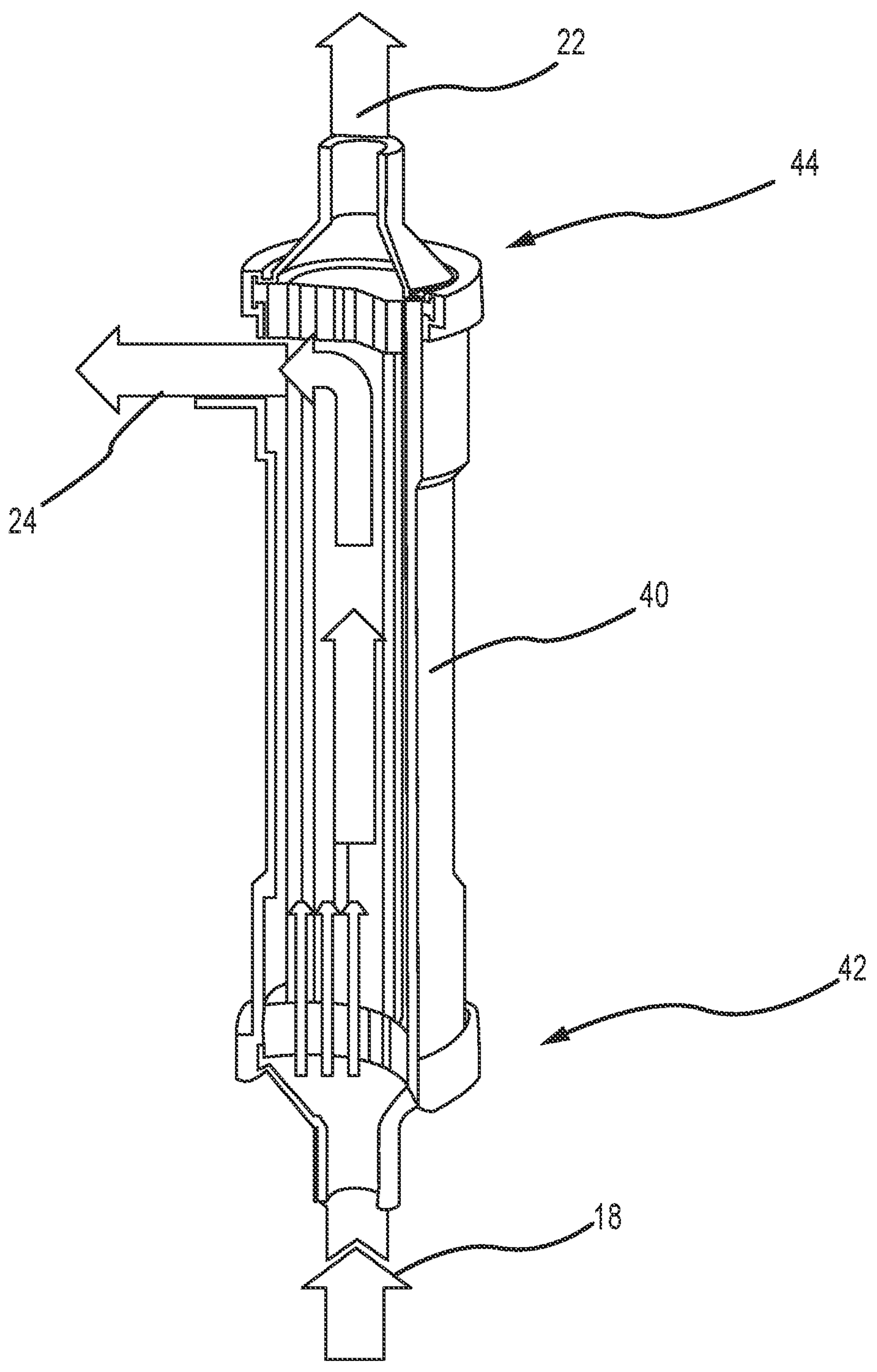
FIG. 6 schematically illustrates one embodiment of a filter shell.

FIGS. 2 and 3 show typical embodiments of spiral-wound membrane elements 20 and the various components and the construction therein. FIG. 2 shows one embodiment of a spiral-wound membrane element 20 comprised of a central perforated permeate tube 26 having perforations 34 therethrough. One or more filter packs 30 are bonded to the permeate tube 26 and wound around the permeate tube 26. Each filter pack 30 layer is separated by a feed spacer 28. The permeate tube 26 is open at the outlet end to allow permeate 22 to flow out and sealed at the inlet end to prevent ingress of a feed stream 18 into the permeate tube 26. The spiral-wound membrane element 20 is sealed within a fluid and pressure resistant shell 40 (one embodiment shown in FIG. 6) before use and has a longitudinal axis parallel with the permeate tube 26 and a transverse axis that is approximately perpendicular to the longitudinal axis. The shell 40 maintains the desired pressure and flow across the membranes.

During use a feed stream 18 is forced under pressure into the inlet end 42 of the shell 40 and flows longitudinally through the space between the filter packs 30 in the fluid channel formed by the feed spacer 28. The feed stream 18 is comprised of at least two constituents. A typical illustrative example of the feed stream 18 would be salt water having an initial concentration of salt. Water with none or a lower concentration of salt travels transversely through the membranes 10 to form a permeate stream 22 of clean water. The permeate stream 22 is directed through the fluid channel formed by the porous permeate carrier layer 32 into the permeate tube 26 and discharged therefrom at the outlet end 44. The remainder of the feed stream 18, now having a higher concentration of salt than it started with, forms a concentrate stream 24 that continues to travel longitudinally through feed spacer 28 until the concentrate stream 24 exits at the outlet end of the shell 40 separately from the permeate stream.

The spiral wound element may be bonded to end caps. Adhesives conventionally used in this end cap bonding application are not typically suitable for bonding membranes 10 and filter packs 30. Reactive hot melt adhesives are not desirable to bond membranes as they will require not only the time to cool and form an initial bond but also additional time for the reactive adhesive to crosslink and cure. Reaction of isocyanate in the reactive adhesive with moisture during the cure reaction can also lead to bubble formation in the bondline and leakage.

EXAMPLES

Viscosity was tested according to ASTM D-3236 using a Brookfield Viscosimeter with a Thermocel heating unit and a 27 spindle.

Set time and open time are tested based on ASTM D4497. Briefly, test material is heated until molten and held for about 15 minutes to equilibrate. A ⅛ inch bead of molten material is applied to a cardboard surface. A wood rod having a diameter of about 0.08 inches is pressed into the applied molten material and withdrawn. The presence or absence of an adhesive string between the wood rod and applied material is noted. The test is repeated at 5 second intervals. Set time is recorded as the time when the withdrawn rod has no heavy stringing. Open time is recorded as the time when the withdrawn rod has no stringing. Set time and open time may be time range.

Integrity of the adhesive bond is tested using a veining test. Prepare a methyl violet test solution by mixing 1 g of methyl violet powder in about 1350 mL of deionized water.

Cut a membrane material into a 3"×7" sheet (two sheets per assembly and one assembly per test). Dow BW30 has been used as a membrane material. Cut a permeate carrier material such as Longsheng LC-30 into a 3"×7" sheet (one sheet per assembly). The active surface 12 is shiny and the support surface 16 is non-shiny. Lay non-shiny support surface 16 of membrane sheet face-up. Place the permeate carrier material over the non-shiny side of membrane sheet. Lay second membrane sheet with the non-shiny side on the permeate carrier material and the shiny side face-up. The assembly will be a membrane sheet/permeate carrier/membrane sheet sandwich in which both membrane sheet shiny sides face "outward". Use masking tape on one of the 3 inch sides to hold the assembly in place and fold the masking tape over the assembly. Staple the assembly in the center of the masking tape. Trim any masking tape extending beyond the assembly.

Provide an approximately three inch diameter roller and tape the stapled end of the assembly to the roller. Pull back the top membrane. Heat adhesive to 180° C. and hold for 20 minutes. Dispense a ½" diameter bead of adhesive down the center of the permeate carrier material. Dispose the top membrane over the permeate carrier material and applied adhesive and roll the roller over the assembly using medium pressure. Note: Do not press so hard the glue is squeezed out, but also not too light that the glue does not spread. Continue rolling until the end of the assembly is reached. Stand roller upright for 24 hours at ambient temperature and conditions. Remove the assembly from roller carefully so as not to break the adhesive bond.

Place the methyl violet in a vacuum chamber and place the glued assembly in the methyl violet solution making sure the assembly is fully submerged. Close the vacuum chamber and pull a vacuum of 25-30 inches Hg or until the methyl violet solution starts to bubble. Maintain the assembly in the methyl violet solution and under vacuum for 1 hour. Release the vacuum, remove the assembly from the methyl violet solution and rinse with water. Dry the rinsed assembly overnight at room temperature.

Figures 5A, 5B:
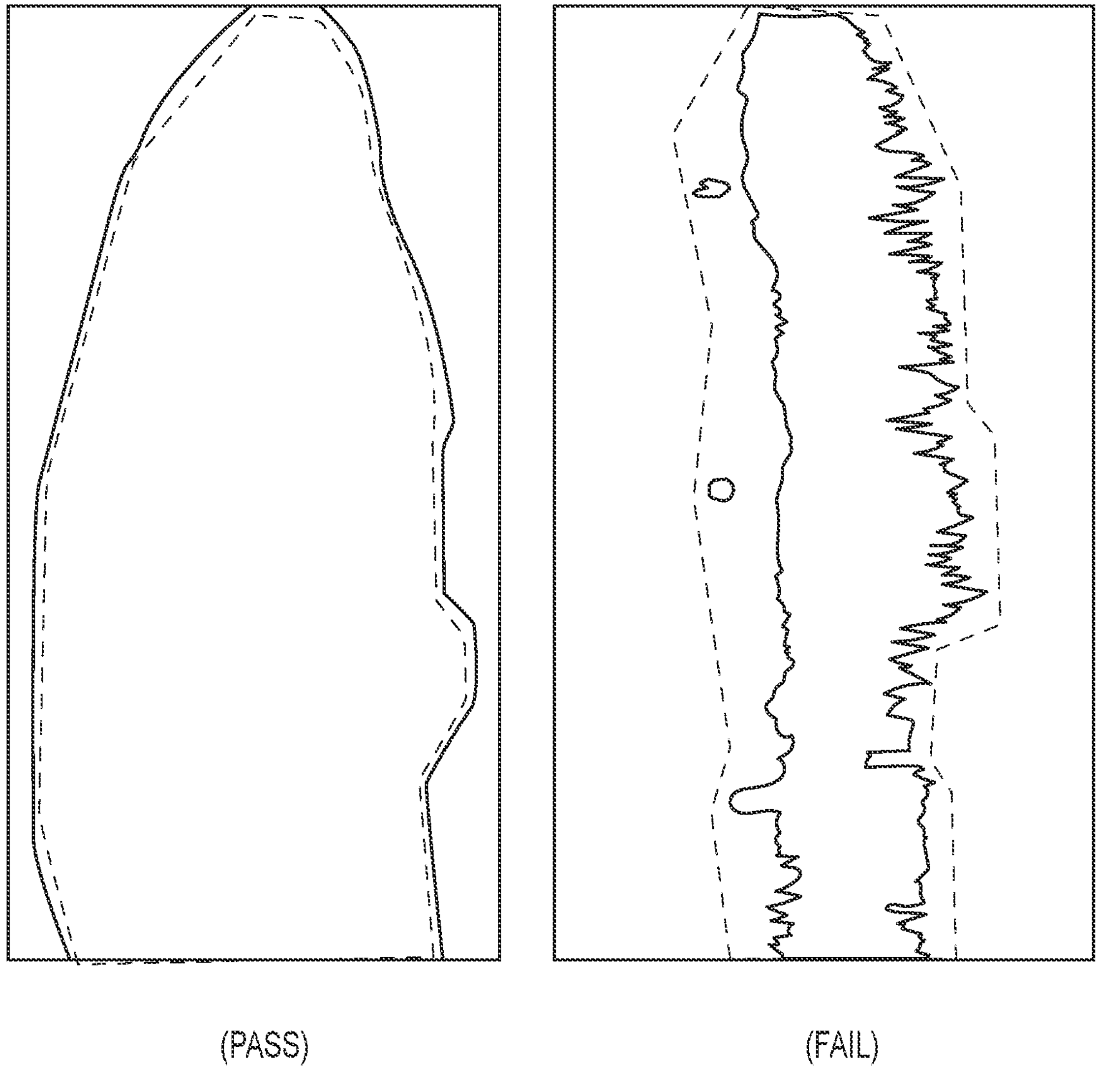
FIG. 5A illustrates a passing result for the veining test.
FIG. 5B illustrates a failing result for the veining test.

Carefully pull the unstapled small side of one membrane away from the adhesive and permeate carrier material. Visually examine the membrane surface to evaluate how far (if at all) the dye penetrated under the adhesive bead. If the dye penetrated more than "¼" under the adhesive toward the interior at any point along the adhesive bead—record as a fail. If the dye penetrated some amount of the adhesive bead but less than "¼" on average—record as a pass. If no dye penetrated under the adhesive bead—record as a pass. FIG. 5*a* illustrates a passing result with the dye stopped at the adhesive bead (dashed line). FIG. 5*b* illustrates a failing result with dye (colored area) penetrating into the interior (white area within the dashed line) more than ¼ inch under the adhesive bead (dashed line). The dashed lines in FIGS. 5*a* and 5*b* show the edges of the adhesive bead.

Example 1

A number of commercially available hot melt adhesives were tested to assess their suitability for use in bonding membrane filter components.

| Sample | base polymer | viscosity (mPas) | OT (sec) | veining test |
|---|---|---|---|---|
| A | EVA | 3300 | 10-20 | fail |
| B | EVA | 4500 | 40-60 | fail |
| C | EVA | 11000 | 60-80 | fail |
| D | PO | 4800 | 10-20 | fail |
| E | PO | 5500 | 60-80 | fail |
| F | EVA | 2550 | 10-20 | fail |
| G | EVA | 2850 | 10-20 | fail |
| H | EVA | 2850 | 10-20 | fail |
| 1 | PO | 4150 | 10-20 | fail |

A TECHNOMELT AS3112
B TECHNOMELT AS947C
C TECHNOMELT AS232
D TECHNOMELT AS4222
E TECHNOMELT AS8843
F HM-302-C2
G PRODAS 626
H VESTOPLAST 703

While these commercially available adhesives are useful in many applications none of them is suitable for bonding membrane filter components. This illustrates how difficult it is to find a thermoplastic hot melt adhesive that can be used to bond membrane filter components. None of the tested adhesives included a thermoplastic butene polymer.

Figure 7:
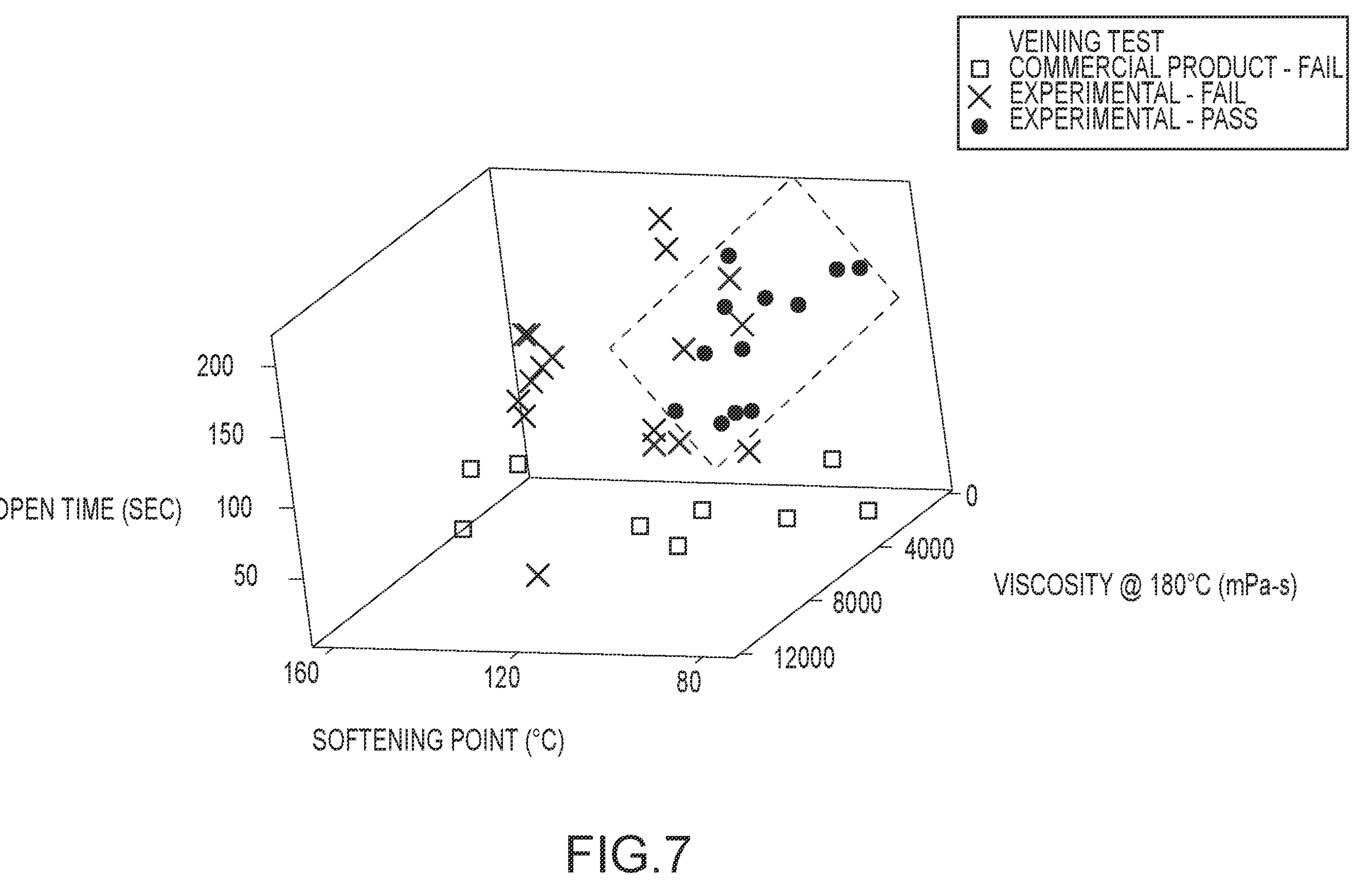
FIG. 7 is a 3 dimensional plot of veining test results for a number of experimental and commercial hot melt adhesives.

A number of experimental hot melt adhesive compositions were prepared using combinations of different APAO propylene homopolymers and copolymers of propylene and/or ethylene and/or butene-1. These hot melt adhesives were tested using the veining test to assess their suitability for use in bonding membrane filter components. Results for the previous commercial hot melt adhesives and the experimental hot melt adhesives are shown in FIG. 7. Hot melt adhesive compositions passing the veining test are all within the dashed area. This data shows there is a surprising combination of open time and softening point and viscosity required to pass the veining test. Even within this area hot melt adhesives that did not include butene, shown as Xs, all failed the veining test. Thus, hot melt adhesives require a combination of open time and softening point and viscosity and butene content to pass the veining test and be suitable for bonding spiral wound membrane filters.

Example 2

The following hot melt adhesives were prepared. Amounts are in wt. %.

| component/Sample | 1 | I | J | K |
|---|---|---|---|---|
| butene propene copolymer[1] | 35 | 0 | 0 | 0 |
| polypropylene (PP) homopolymer[2] | 0 | 35 | 0 | 0 |
| polypropylene (PP)/polyethylene (PE) copolymer[3] | 0 | 0 | 35 | 0 |
| polyethylene (PE) copolymer[4] | 0 | 0 | 0 | 35 |
| butene ethylene copolymer[5] | 34.5 | 34.5 | 34.5 | 34.5 |
| tackifier[6] | 30 | 30 | 30 | 30 |
| antioxidant[7] | 0.5 | 0.5 | 0.5 | 0.5 |

[1]RT2815 available from REXtac LLC
[2]Eastoflex P1023 available from Eastman Chemical Company
[3]Eastoflex M1030 available from Eastman Chemical Company
[4]Eastoflex E1060 available from Eastman Chemical Company
[5]PBM1200 available from Lyondell Bassel
[6]Eastotac H130 available from Eastman Chemical Company
[7]Irganox 1010 available from BASF The prepared hot melt adhesives were tested to assess their suitability for use in bonding membrane filter components.

| Sample | polymer | viscosity (mPas) | OT (sec) | veining test |
|---|---|---|---|---|
| 1 | butene-1 copolymer | 2800 | 130 | pass |
| I | PP homopolymer | 3325 | 65 | fail |
| J | PP/PE copolymer | 3450 | 75 | fail |
| K | PE copolymer | 5250 | 85 | fail |

These results again show that many hot melt adhesives including comparative samples I, J and K, are not suitable for bonding membrane materials. Surprisingly, Sample 1 based on a butene-1 copolymer can be used to bond membrane materials. This appears due to the thermoplastic butene polymer.

Example 3

The following hot melt adhesives were prepared. Amounts are in wt. %.

| component/Sample | 2 | 3 | 4 | 5 |
|---|---|---|---|---|
| butene ethylene copolymer[1] | 7 | 20 | 29.5 | 25 |
| butene ethylene copolymer[2] | 59.5 | 0 | 0 | 0 |
| butene copolymer[3] | 0 | 44.5 | 0 | 0 |
| butene copolymer[4] | 0 | 0 | 0 | 44.5 |
| EVA copolymer resin[5] | 0 | 0 | 40 | 0 |
| wax[6] | 3.0 | 0 | 0 | 0 |
| wax[7] | 0 | 5.0 | 0 | 0 |
| tackifier[8] | 30.0 | 30.0 | 0 | 0 |
| tackifier[9] | 0 | 0 | 30 | 30 |
| antioxidant[10] | 0.5 | 0.5 | 0.5 | 0.5 |
| total | 100 | 100 | 100 | 100 |

[1]PBM 1200 available from Lyondell Bassel
[2]PBM 1500 available from Lyondell Bassel
[3]RT2807 available from REXtac LLC
[4]RT2815 available from REXtac LLC
[5]ESCORENE UL8705 available from Exxon Mobil
[6]Sasol H1 available from Sasol Performance Chemicals
[7]IGI 1304S available from the International Group Inc.
[8]Eastotac H100 available from Eastman Chemical Company
[9]Eastotac H130 available from Eastman Chemical Company
[10]Irganox 1010 available from BASF The prepared hot melt adhesives were tested to assess their suitability for use in bonding membrane filter components.

| Sample | viscosity (mPas) | OT (sec) | veining test |
|---|---|---|---|
| 2 | 6400 | 120 | pass |
| 3 | 875 | 170 | pass |
| 4 | 7500 | 130 | pass |
| 5 | 2150 | 160 | pass |

Example 4

Filter packs were assembled using Dow-XLE 1812T membrane material and a permeate carrier. Two inventive thermoplastic hot melt adhesives (6, 7) and a Comparative Sample L, a two component commercial polyurethane adhesive available as 3543-2 from Fuller Adhesives, were used to bond the filter packs. In each trial adhesive was applied in a bead adjacent 3 sides of a rectangular membrane sheet. Permeate carrier was disposed within the adhesive bead and a send membrane sheet was disposed over the first membrane sheet and in contact with the applied adhesive. The assembly was rolled around a permeate tube to form a spiral wound element.

The hot melt adhesive was dispensed onto the membrane in about 18 seconds at application temperatures of 300 to 355° F. were used with an application temperature of 350° F. providing the longest open (working) time. Application of hot melt adhesive at 355° F. had no deleterious effects on the membrane. Samples were run with different applied adhesive amounts and 20-25 grams was found to be preferred.

The inventive thermoplastic adhesives (samples 6 and 7) had the following formulation. Amounts are wt. %.

| component/Sample | 6 | 7 |
|---|---|---|
| butene ethylene copolymer[1] | 34.5 | 25.0 |
| butene copolymer[2] | 35.0 | 44.5 |
| tackifier[3] | 30.0 | 30.0 |
| antioxidant[4] | 0.5 | 0.5 |
| total | 100 | 100 |

[1]PBM 1200 available from Lyondell Bassel
[2]RT2815 available from REXtac LLC
[3]Eastotac H130 available from Eastman Chemical Company
[4]Irganox 1010 available from BASF For comparative Sample L the two components were mixed according to manufacturer's recommendations and applied to the membrane. About 60 grams of mixed adhesive was applied to a membrane and the rolled element was held at room temperature for about 8 hours to allow the adhesive to cure. In commercial production wound filters using polyurethane adhesives are allowed to cure for at least 4-8 hours before end trimming and about 24 hours before pressure testing.

Inventive Samples 6 and 7 and Comparative sample L were tested. Results are shown in the Table below.

| Sample | viscosity (mPas) | OT (sec) | veining test |
|---|---|---|---|
| 6 | 2800 | 130 | pass |
| 7 | 7200 | 120 | pass |
| Comp L | NT | NT | pass |

NT = not tested

Element Flow and Filtration Ability

The filter elements were tested flux (amount of filtered water flowing through the test filter pack) and rejection (% of NaCl not flowing through the filter pack). Testing was done by placing the sample element into a commercial filtration vessel and filtering an aqueous solution of 500 ppm NaCl in water at 100 psi. Measurements were taken when the filtering was initially started and after 12 hours of filtration. Results are shown in the following table.

| | flux initial | flux 12 hrs. | rejection initial | rejection 12 hrs. |
|---|---|---|---|---|
| 6 | 41 | 37 | 97 | 98 |
| 7 | 41 | 29 | 96 | 98 |
| Comp L | 36 | 25 | 97 | 99 |

Figure 8:
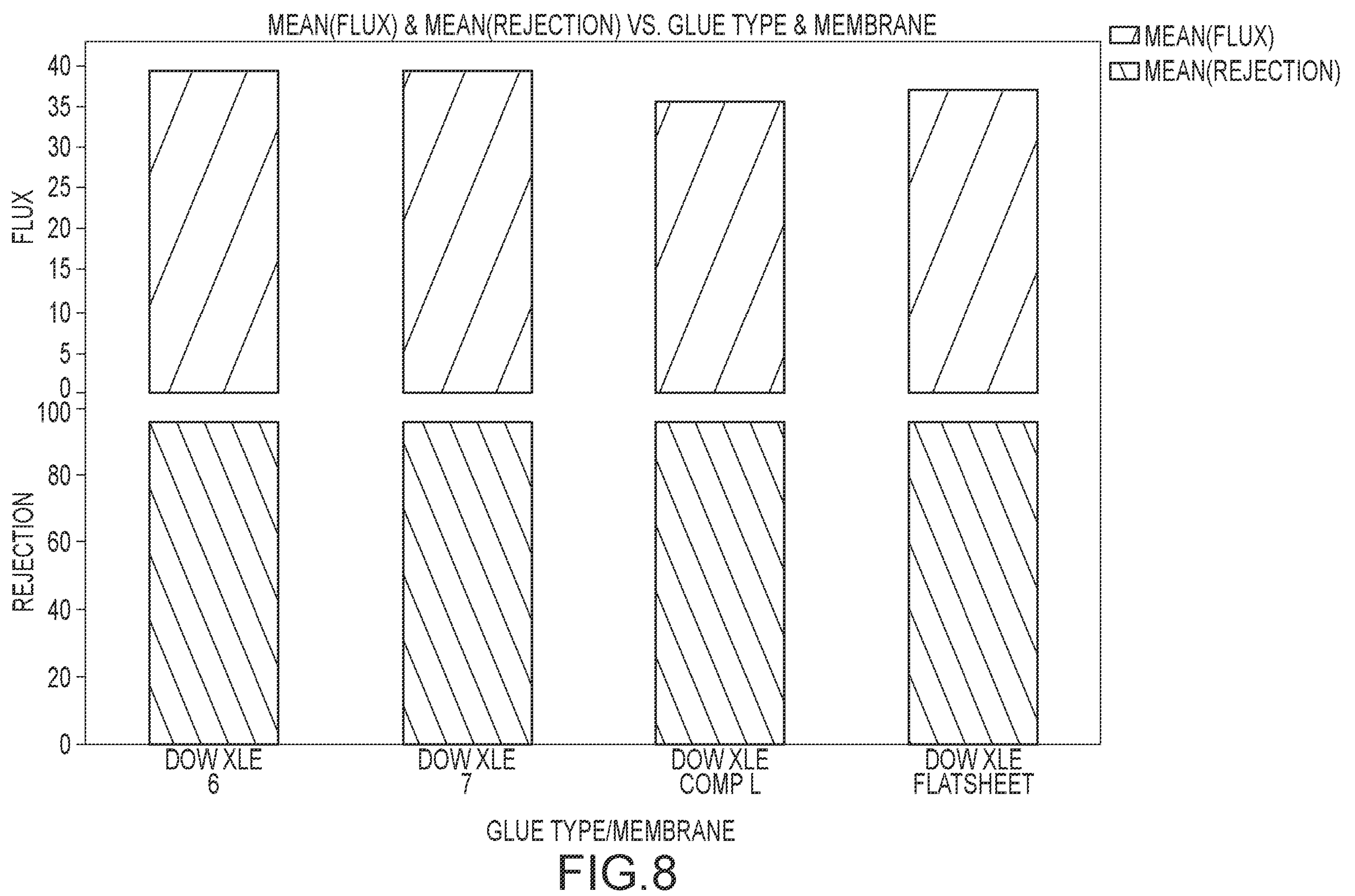
FIG. 8 illustrates flux and rejection results for a base membrane, spiral-wound filter elements made using disclosed hot melt adhesives and a spiral-wound filter element made using a commercial polyurethane adhesive.

Results in the above Table are illustrated in FIG. 8 which also shows the base flux and rejection for a single sheet of Dow XLE membrane. Filter elements made using the inventive hot melt adhesives had better flow through the spiral wound filter element (flux) compared to filter elements made using a commercial two component polyurethane adhesive and the single sheet of Dow XLE membrane. Filter elements made using the inventive adhesives had the same filtration performance (rejection) compared to filter elements made using a commercial two component polyurethane adhesive and the single sheet of Dow XLE membrane.

Importantly, elements made using the inventive thermoplastic hot melt adhesive can be pressure tested in as little as 0.5 hours. Elements made using curable polyurethane adhesives require 8 to 24 hours of cure time before they can be pressure tested.

Element Trim Time

During the rolling operation adhesive is squished out the ends of the rolled element and there can also be some axial unevenness of the membrane layers. To remedy this filter elements are trimmed using a rotating saw blade to remove a small amount of material and extruded adhesive from both axial edges. Samples of elements made using comparative 2K curable polyurethane adhesives were trimmed at intervals longer than 8 hours to allow the adhesive to partially cure. Samples of elements made using the inventive thermoplastic hot melt adhesive were trimmed at intervals from 0.5 hours to 20 hours.

Both the comparative and inventive samples retained their flux and rejection performance after trimming. The comparative samples exhibited a clean cut after 8 hours of cure time. The inventive samples had a cut edge with evidence of fluff from the thermoplastic hot melt adhesive. However, the fluff was merely aesthetic and had no impact on the flux or rejection performance. Importantly, elements made using the inventive thermoplastic hot melt adhesive can be trimmed in as little as 0.5 hours compared to the 8 or more hours required for elements made using a curable polyurethane adhesive.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

What is claimed is:

1. A separation apparatus including:

a first composite membrane capable of separating a first constituent from a feed fluid mixture and having a barrier layer with a barrier surface and an opposing support layer with a support surface;

a second composite membrane capable of separating the first constituent from the feed fluid mixture and having a barrier layer with a barrier surface and an opposing support layer with a support surface;

a fluid permeable permeate carrier sheet having opposing first and second surfaces;

wherein the first composite membrane and the second composite member are arranged to that the support surface of the first composite membrane is adjacent the fluid permeable permeate carrier sheet first surface and the support surface of the second composite membrane support surface is adjacent the fluid permeable permeate carrier sheet second surface; and a thermoplastic hot melt adhesive disposed in one or more discrete areas between the first composite membrane, the fluid permeable permeate carrier sheet and the second composite membrane, the adhesive forming a fluid impermeable bonded area between a portion of the first composite membrane support surface, the fluid permeable permeate carrier sheet and a portion of the second composite membrane support surface.

2. The separation apparatus according to claim 1, wherein the thermoplastic hot melt adhesive comprises:

a thermoplastic homopolymer or copolymer comprising butene;

tackifier; and optionally one or more additives.

3. The separation apparatus according to claim 1, wherein the thermoplastic hot melt adhesive comprises:

a thermoplastic homopolymer or copolymer comprising butene;

wax;

tackifier; and optionally one or more additives.

4. The separation apparatus according to claim 1, wherein the hot melt adhesive comprises:

a thermoplastic homopolymer or copolymer comprising butene;

a thermoplastic homopolymer or copolymer free of butene;

tackifier; and optionally one or more additives.

5. The separation apparatus according to claim 1, wherein the bonded area has a penetration of no more than 0.25 inches when tested using the veining test.

6. The separation apparatus according to claim 1, wherein the separation apparatus further comprises a third composite membrane capable of separating the first constituent from the feed fluid mixture and having a barrier layer with a barrier surface and an opposing support layer with a support surface, wherein the third membrane barrier surface is adjacent the second membrane barrier surface; and a porous feed spacer is disposed between the second composite membrane and the third composite membrane.

7. The separation apparatus according to claim 1, wherein at least one of the the first composite membrane and the second composite membrane comprises microporous substrate disposed between the barrier layer and the support layer.

8. The separation apparatus according to claim 1, wherein the first composite membrane, the second composite membrane and the fluid permeable permeate carrier sheet each comprise a plurality of peripheral edges and the thermoplastic hot melt adhesive is disposed around most of the peripheral edges forming a bonded area around most of the periphery of the first composite membrane, the second composite membrane and the fluid permeable permeate carrier sheet, wherein at least a portion of one peripheral edge of the first composite membrane, the second composite membrane and the fluid permeable permeate carrier sheet is not bonded and forms a permeate exit and the central portion of the first composite membrane, the second composite membrane and the fluid permeable permeate carrier sheet is not bonded and forms a permeate flow channel fluidly connected to the permeate exit.

9. The separation apparatus according to claim 1, comprising a plurality of filter packs fluidly connected to a permeate tube and wound around the permeate tube, wherein each filter pack comprises the first and the second composite membranes peripherally bonded to the fluid permeable carrier sheet with the hot melt adhesive.

10. The separation apparatus according to claim 1, wherein the thermoplastic hot melt adhesive comprises butene and has a viscosity at 180° C. of about 500 to about 8,000 mPas; and/or a softening point of about 55 to about 150° C.; and/or an open time of about 30 seconds or more and/or a Shore A hardness of about 50 or greater.

11. The separation apparatus according to claim 1, wherein the thermoplastic hot melt adhesive comprises butene and has a viscosity at 180° C. of about 800 to about 7,500 mPas; and/or a softening point of about 80 to about 105° C.; and/or an open time of about 70 seconds or more and/or a Shore A hardness of about 50 to about 95.

12. A separation apparatus including:

a first composite membrane capable of separating a first constituent from a feed fluid mixture and having a barrier layer with a barrier surface and an opposing support layer with a support surface;

a second composite membrane capable of separating the first constituent from the feed fluid mixture and having a barrier layer with a barrier surface and an opposing support layer with a support surface;

a fluid permeable permeate carrier sheet having opposing first and second surfaces;

wherein the first composite membrane and the second composite membrane are arranged so that the support surface of the first composite membrane is adjacent the fluid permeable permeate carrier sheet first surface and the support surface of the second composite membrane is adjacent the fluid permeable permeate carrier sheet second surface; and a thermoplastic hot melt adhesive disposed in one or more discrete areas of the first membrane layer, the carrier sheet and/or the second membrane layer.

13. The separation apparatus according to claim 12, wherein the thermoplastic hot melt adhesive comprises:

a thermoplastic homopolymer or copolymer comprising butene;

tackifier; and optionally one or more additives.

14. The separation apparatus according to claim 1, wherein the thermoplastic hot melt adhesive comprises butene, has a viscosity at 180° C. of about 500 to about 8,000 mPas, a softening point of about 55 to about 150° C., and an open time of about 30 seconds or more.

15. The separation apparatus according to claim 12, wherein the thermoplastic hot melt adhesive comprises butene, has a viscosity at 180° C. of about 500 to about 8,000 mPas, a softening point of about 55 to about 150° C., and an open time of about 30 seconds or more.

* * * * *